US011229865B2

(12) United States Patent
Decker

(10) Patent No.: US 11,229,865 B2
(45) Date of Patent: Jan. 25, 2022

(54) METHOD AND APPARATUS FOR JOINING TOGETHER MODULAR CANDLE FILTERS

(71) Applicant: UNIFRAX I LLC, Tonawanda, NY (US)

(72) Inventor: Jens Decker, Ann Arbor, MI (US)

(73) Assignee: UNIFRAX 1 LLC, Tonawanda, NY (US)

( * ) Notice: Subject to any disclaimer, the term of this patent is extended or adjusted under 35 U.S.C. 154(b) by 0 days.

(21) Appl. No.: 17/326,582

(22) Filed: May 21, 2021

(65) Prior Publication Data

US 2021/0362083 A1 Nov. 25, 2021

Related U.S. Application Data

(60) Provisional application No. 63/028,781, filed on May 22, 2020.

(51) Int. Cl.
*B01D 46/00* (2006.01)
*C04B 28/34* (2006.01)
*B01D 46/24* (2006.01)

(52) U.S. Cl.
CPC ..... *B01D 46/0001* (2013.01); *B01D 46/2407* (2013.01); *B01D 46/002* (2013.01); *B01D 2265/04* (2013.01); *C04B 28/342* (2013.01)

(58) Field of Classification Search
CPC .............. B01D 46/0001; B01D 46/002; B01D 46/0057; B01D 46/0067; B01D 46/0068; B01D 46/0069; B01D 46/0071; B01D 46/0083; B01D 46/2407; B01D 2265/04; B01D 2273/20; F16L 13/10; F16L 13/103; F16L 33/30
See application file for complete search history.

(56) References Cited

U.S. PATENT DOCUMENTS

| | | | | | |
|---|---|---|---|---|---|
| 2,615,235 A | * | 10/1952 | Hadley | .................... | B23K 1/00 228/165 |
| 4,105,562 A | * | 8/1978 | Kaplan | .................. | B01D 29/54 210/232 |
| 4,504,555 A | * | 3/1985 | Prior | ....................... | C04B 28/34 106/690 |
| 4,867,769 A | * | 9/1989 | Oda | ................... | B01D 46/0009 55/302 |

(Continued)

FOREIGN PATENT DOCUMENTS

DE 102012107097 A1 * 5/2014 ............. B01D 39/20
EP 0588525 A1 * 3/1994 ......... B01D 46/2407

OTHER PUBLICATIONS

DE102012107097A1_ENG (Espacenet machine translation of Schroer) (Year: 2014).*

(Continued)

*Primary Examiner* — Jonathan Miller
*Assistant Examiner* — Gabriel E Gitman
(74) *Attorney, Agent, or Firm* — Haynes and Boone, LLP

(57) ABSTRACT

A system for forming a hollow modular candle filter includes: a first filter portion having at least one open end; a hollow second filter portion having at least one open end; a sleeve configured to fit within the open end of the first filter portion and the open end of the second filter portion; and an adhesive configured to bind the sleeve to each of the first filter portion and the second filter portion.

27 Claims, 14 Drawing Sheets

(56) References Cited

U.S. PATENT DOCUMENTS

| | | | | |
|---|---|---|---|---|
| 4,894,070 A * | 1/1990 | Keidel | ............... | B01D 46/2407 |
| | | | | 95/280 |
| 5,223,012 A | 6/1993 | Best et al. | | |
| 5,580,456 A | 12/1996 | Bowlsbey | | |
| 5,849,375 A | 12/1998 | Smith et al. | | |
| 6,183,529 B1 * | 2/2001 | Musso | ............... | B01D 46/2407 |
| | | | | 55/484 |
| 6,375,698 B1 * | 4/2002 | Clements | ........... | B01D 46/0021 |
| | | | | 55/341.1 |
| 6,447,596 B1 * | 9/2002 | Tremblay | .............. | C04B 28/342 |
| | | | | 106/691 |
| 2010/0126350 A1 * | 5/2010 | Sharma | .............. | B01D 46/0041 |
| | | | | 95/268 |
| 2014/0020561 A1 | 1/2014 | Aery | | |
| 2017/0320013 A1 | 11/2017 | Fernando | | |
| 2017/0341004 A1 | 11/2017 | Miller et al. | | |
| 2019/0134551 A1 * | 5/2019 | Petz | ................... | B01D 46/2407 |

OTHER PUBLICATIONS

International Search Report and Written Opinion of the International Search Authority issued by the U.S. Patent and Trademark Office for International Application No. PCT/US2021/033557 dated Oct. 6, 2021. (14 pages).

\* cited by examiner

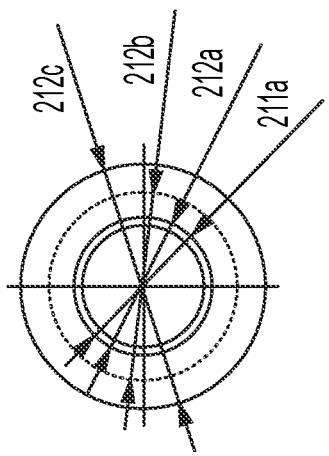
FIG. 2B
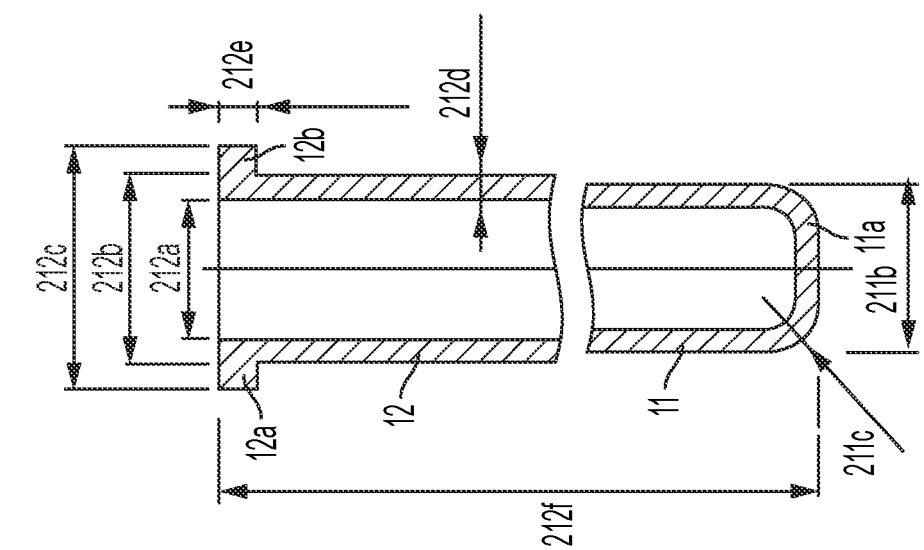
FIG. 2A

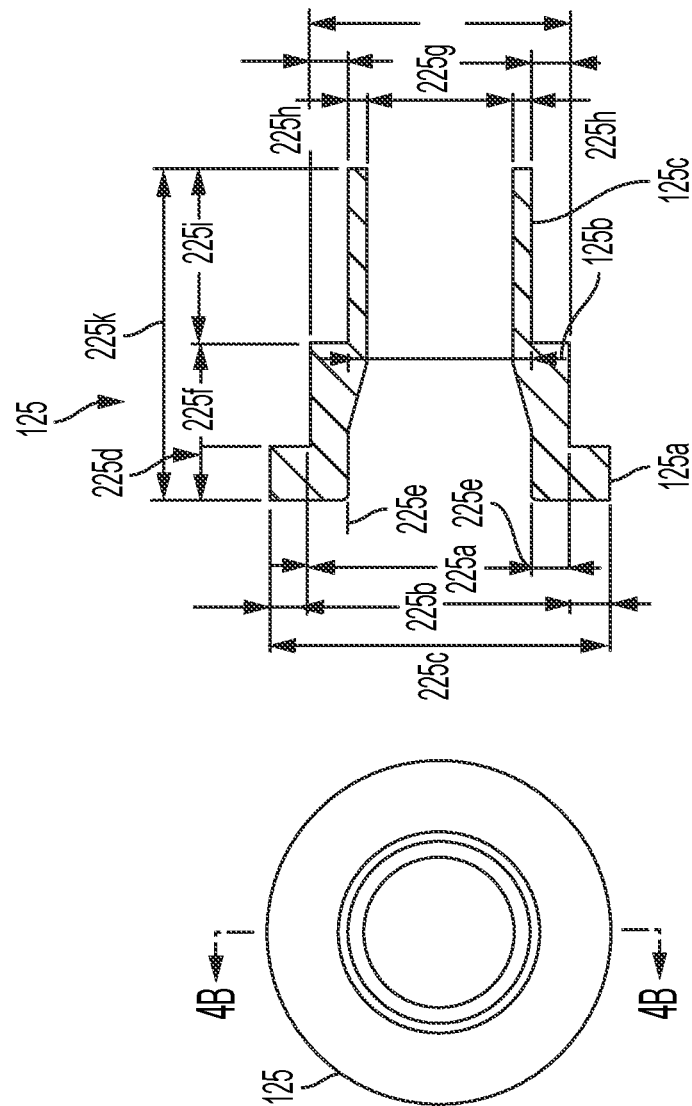

METHOD AND APPARATUS FOR JOINING TOGETHER MODULAR CANDLE FILTERS

CROSS-REFERENCE TO RELATED APPLICATIONS

This application claims priority to U.S. Provisional Application No. 63/028,781 filed May 22, 2020, the contents of which are herein incorporated in their entirety.

FIELD OF THE DISCLOSURE

The present disclosure relates to a method and apparatus for joining together modular components to form a modular candle filter. In particular, the modular candle filter may be a candle filter used for hot gas filtration (HGF), such as those described in U.S. Patent Application Publication Nos. 2017/0341004 A1 and 2017/0320013 A1, the entire disclosures of which are hereby incorporated herein by reference.

BRIEF DESCRIPTION OF THE DRAWINGS

FIG. 2A is a sectional view of a modular filter according to an embodiment of the present disclosure.

FIG. 2B is a top view of the modular filter shown in FIG. 2A.

FIG. 4 is a sectional and top view of a support flange according to an embodiment of the present disclosure.

DETAILED DESCRIPTION

Figure 1:
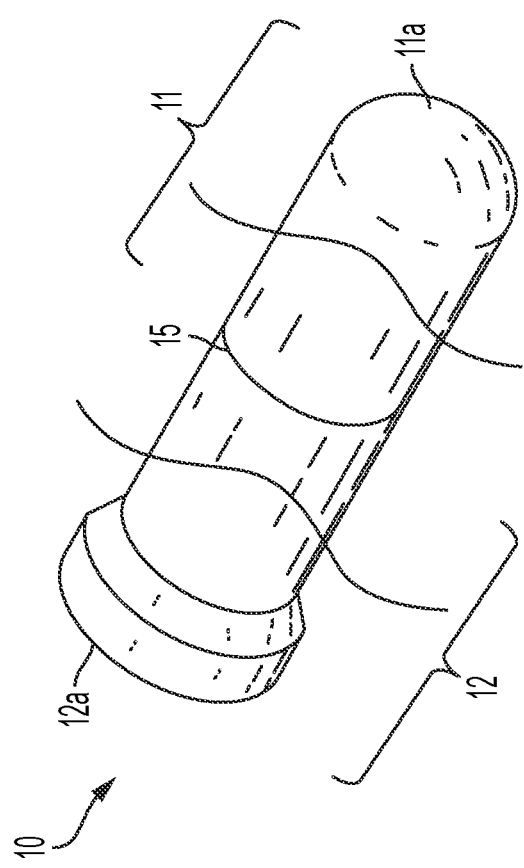
FIG. 1 is a perspective view of a modular filter according to an embodiment of the present disclosure.

Referring to FIG. 1, a modular filter 10 according to the present disclosure includes at least two hollow filter portions, an upper filter portion 12 and a lower filter portion 11. The filter portions 11, 12 are joined at joint 15. In one or more embodiments, the modular filter 10 may include three or more filter portions, each being joined at joints similar to joint 15. In one or more embodiments, a lower filter portion 11 may include a closed end 11a opposite the joint 15. In one or more embodiments, the upper filter portion 12 may include an open end 12a opposite the joint 15. The open end 12a may be straight or may include a flange 12b.

In one or more embodiments, each of the upper filter portion 12 and the lower filter portion 11 may be made of the same material. For instance, the filter material may comprise inorganic fibers and one or more binders, and the filter portions 11, 12 may be vacuum formed. Methods of forming the filter portions 11, 12 and materials may be similar to those disclosed in U.S. Patent Application Publication Nos. 2017/0341004A1 and 2017/0320013A1, which are herein incorporated by reference in their entireties.

With reference to FIG. 2A, according to one or more embodiments, the upper filter portion 12 may have an inner diameter 212a at open end 12a of about 110 mm (i.e., 108-112 mm), 80 to 140 mm, 90 to 130 mm, or 100 to 120 mm. In one or more embodiments, the wall thickness 212d of the upper filter portion 12 of the modular filter 10 may be about 20 mm (i.e., 18-22 mm), 10 to 30 mm, or 15 to 25 mm. As such, according to one or more embodiments, the upper filter portion 12 may have an outer diameter 212b at open end 12a of about 150 mm (i.e., 149-151 mm), 120-180 mm, 130-170 mm, or 140-160 mm. In one or more embodiments, the open end 12a may include a flange 12b that extends radially from the wall. The flange 12b may be integrally formed with the upper filter portion 12 of the modular filter 10. The flange 12b may have a thickness 212e (measured in the length direction of the modular filter 10) of about 30 mm (i.e., 29-31 mm), 20-40 mm, or 25-35 mm. The flange 12b may extend from the wall of the upper filter portion 12 by a distance of about 22.5 mm (i.e., 20-25 mm), 5-40 mm, 10-35 mm, or 15-30 mm, such that an outer diameter 212c of the flange is about 195 mm (i.e., 193-197 mm), 165-225 mm, 175-215 mm, or 185-205 mm.

In any embodiment, the wall thickness of the lower filter portion 11 and the upper filter portion 12 may be uniform along the entire length of the modular filter 10. In one or more embodiments, the lower filter portion 11 may have an inner diameter at the closed end 11a as described above for the upper filter portion 12 at open end 12a. In one or more embodiments, the modular filter 10 may taper from the open end 12a to the closed end 11a. For instance, as shown in FIG. 2B, the lower filter portion 11 may have an inner diameter 211a at the closed end 11a of about 95 mm (i.e., 92-98 mm), 70-120 mm, 80-110 mm, or 90-100 mm. In one or more embodiments, the lower filter portion 11 may have an outer diameter 211b at closed end 11a of about 135 mm (i.e., 132-138 mm), 110-160 mm, 120-150 mm, or 130-140 mm. In one or more embodiments, the closed end 11a may include a flat center with rounded corners, wherein the rounded corners may have a radius of curvature 211c of, for example, 30-60 mm, 40-50 mm, or 45 mm.

In one or more embodiments, a length 212f of the modular filter may be about 3000 mm (i.e., 2990-3010 mm), about 6000 mm (i.e., 5990-6010 mm), about 9000 mm (i.e., 8990-9010 mm), 2000-10000 mm, 2000-8000 mm, 2500-7000 mm, 2500-6500 mm, 2500-3500 mm, or 5500-6500 mm. In any embodiment, the closed end 11a may have the same wall thickness as that along the length of the modular filter 10. In one or more embodiments, the wall thickness may taper.

Figures 3A, 3B:
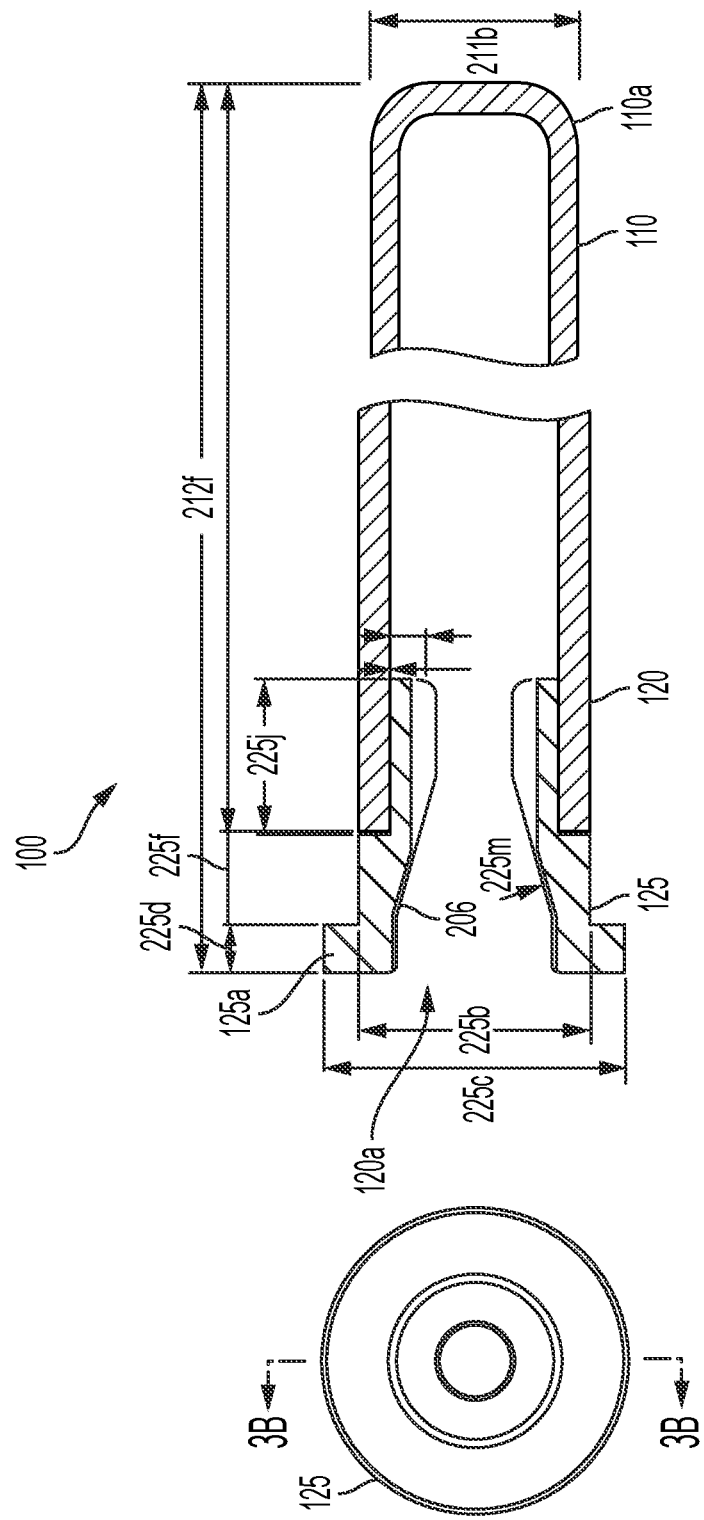
FIG. 3 is a sectional and top view of a modular filter according to an embodiment of the present disclosure.

With reference to FIG. 3, according to one or more embodiments, a modular filter 100 may include a lower filter portion 110 having a closed end 110a and an upper filter portion 120 having an open end 120a. The dimensions of the modular filter 100 may be the same as those described above for modular filter 10. In one or more embodiments, open end 120a is straight and does not include an integrally formed flange. Rather, to support the modular filter 100, a support flange 125 may be inserted into open end 120a and affixed to the modular filter 10. The support flange 125 may be affixed using an adhesive, such as those described below. The support flange 125 may have a length 225k of about 189 mm (i.e., 186-192 mm), 185-195 mm, 180-200 mm, 175-205 mm, or 170-210 mm. The length of the modular filter 100 including the flange 125 may be as described for the length 212f above.

The support flange 125 is shown in greater detail in FIG. 4. In one or more embodiments, the support flange 125 may include a lip 125a having a thickness 225d (measured in the length direction of the modular filter 10) of about 30 mm (i.e., 29-31 mm), 20-40 mm, or 25-35 mm. The lip 125a may have an outer diameter 225c of about 195 mm (i.e., 193-197 mm), 165-225 mm, 175-215 mm, or 185-205 mm and an inner diameter of about 106 mm (i.e., 103-109), 90-120 mm, 95-115 mm, or 100-110 mm. In one or more embodiments, the inner diameter 225a of the lip 125a is identical to an inner diameter of the upper filter portion 120. Below the lip 125a, the outer diameter 225b of the support flange may be the same as the outer diameter of the upper filter portion 120, as described above.

The support flange 125 includes a shoulder 125b configured to engage a top edge of the upper filter portion 120 of the modular filter 100. According to one or more embodiments, the shoulder 125b has a depth 225e matching the wall thickness 212d of the upper filter portion 120 of the modular filter 10. In one or more embodiments, the depth 225e of the shoulder 125b is 0.1-4 mm, 0.5-2.5 mm, 1-2 mm, or 1.5 mm greater than the wall thickness of the upper filter portion 120 to allow space for the adhesive. In one or more embodiments, the shoulder 125b may be distanced from a lower edge of lip 125a, in a length direction of the upper filter portion 120 of the modular filter 100, by a distance 225f about 59 mm (i.e., 56-62 mm), 45-75 mm, 50-70 mm, or 55-65 mm.

The support flange 125 further includes an insert portion 125c, which is configured to insert into the open end 120a of the upper filter portion 120 of the modular filter 100. According to one or more embodiments, an outer diameter 225g of the insert portion 125c is the same as the inner diameter 212a of the upper filter portion 120 to provide for an interference fit. According to one or more embodiments, the outer diameter 225g of the insert portion 125c is 0.1-10 mm, 0.5-5 mm, 2-4 mm, or 3 mm less than the inner diameter 212a of the upper filter portion 120 in order to allow space for an adhesive between the insert portion 125c and the upper filter portion 120. In one or more embodiments, the insert portion 125c may have a thickness 225h of about 12 mm (i.e., 10-14 mm), 4-25 mm, 5-20 mm, or 8-16 mm. In one or more embodiments, the insert 125c has a length 225i of about 100 mm (i.e., 95-105 mm), 75-125 mm, 80-120 mm, 85-115 mm, or 90-110 mm. An insertable length 225j of the insert portion 125c may be slightly less than its length 225i due to the adhesive between the shoulder 125b and the upper filter portion 12 of the modular filter 100. For instance, the insertable length 225j may be 0.1-3 mm, 0.5-2 mm, 1-2 mm, or 1.5 mm less than the length of the insert portion 125c.

An inner diameter of the support flange 125 may taper from an upper area (e.g., below lip 125a) to an inner portion of insert portion 125c. As shown in FIG. 3, such a configuration allows for insertion of a Venturi 206 into the support flange 125. The Venturi 206 is configured to force pressurized air into the modular filter 100 for cleaning purposes. The taper of the support flange 125 may be configured to allow some clearance 225m between the support flange 125 and the Venturi 206, for example, 1-5 mm, 1-3 mm, or 2 mm. In one or more embodiments, the support flange 125 may be made of a ceramic material to provide extra support for the modular filter 100 when placed in service, such as by a hanging installation in a bag house.

In one or more embodiments, the support flange 125 comprises a hard ceramic material. For example, in some embodiments, the support flange 125 comprises a cordierite-containing refractory material pre-fired to 1200° C. In some embodiments, the support flange 125 comprises mullite, silicon carbide, zirconia, alumina, and/or alumina-titania. In one or more embodiments, the support flange 125 is configured to maintain its integrity during a shear test wherein the support flange 125 is subjected to a 63 kg tensile stress, heated to 600° C., and again subjected to the 63 kg tensile stress.

Figure 5:
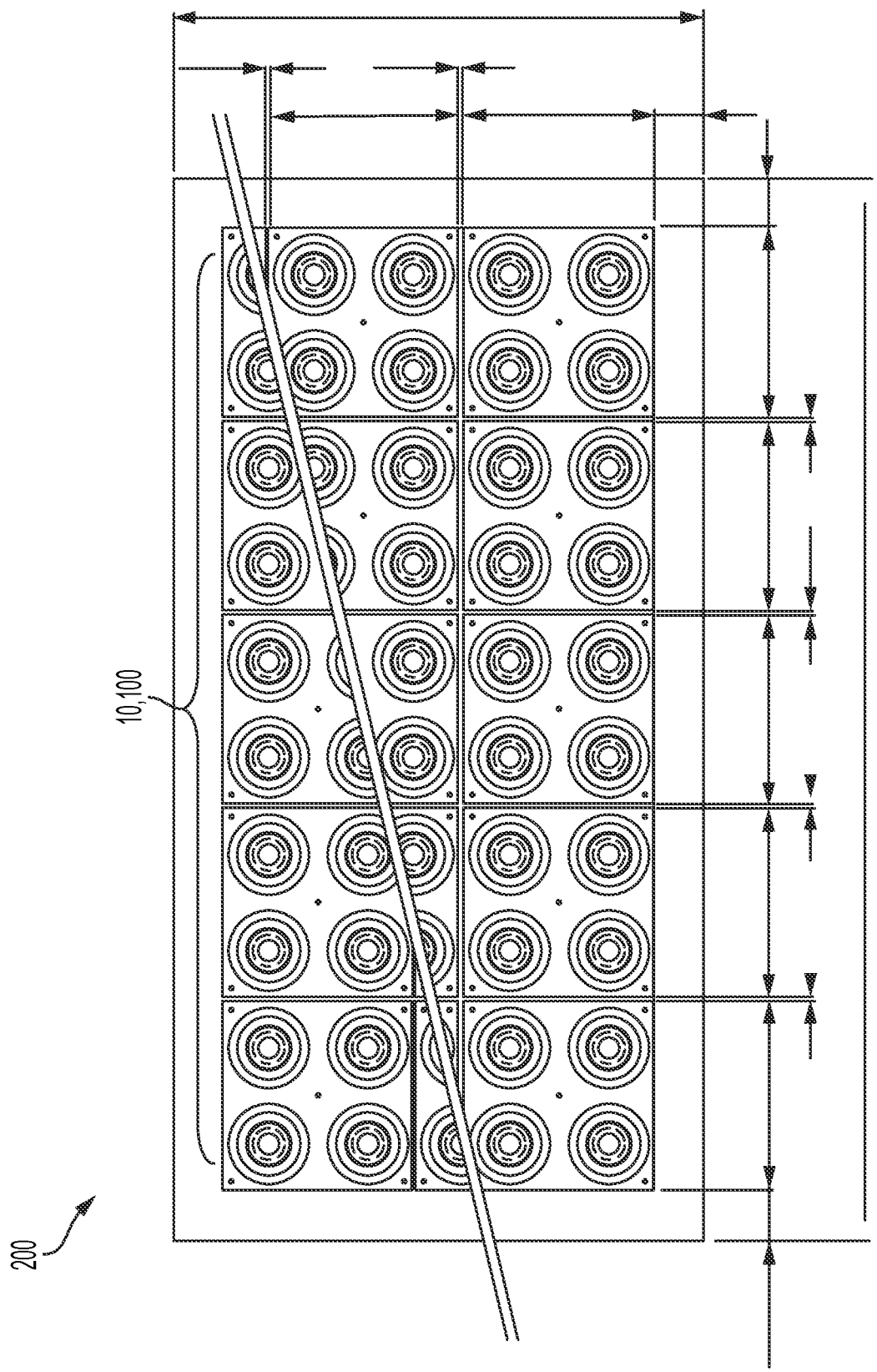
FIG. 5 is a top view of a bag house according to an embodiment of the present disclosure.

Referring to FIG. 5, a bag house 200 may include a plurality of modular filters 10, 100 hung therein. In some embodiments, the bag house 200 may include 2000 or more modular filters 10, 100. The measurement shown in FIG. 5 are in mm and merely represent nonlimiting examples of spacing of the modular filters 10, 100.

Figure 6A:
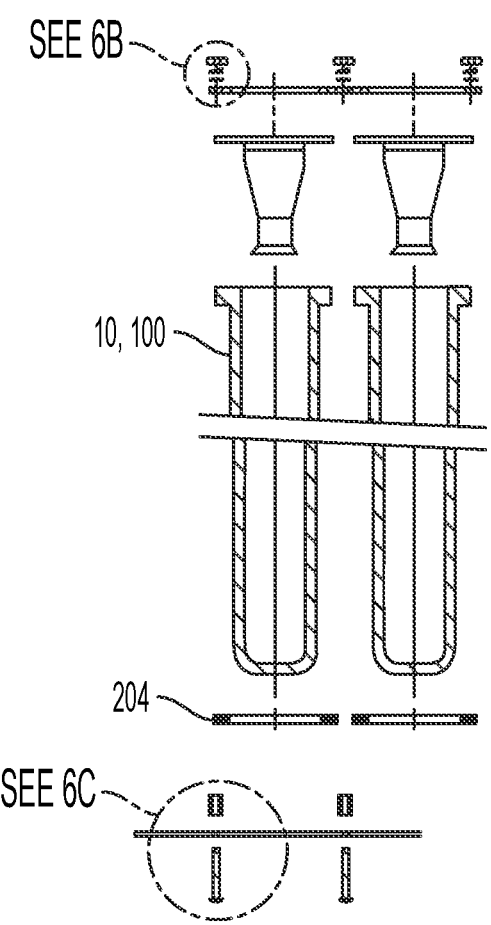
FIGS. 6A-6C are a sectional view and detail views of a modular filter installation according to an embodiment of the present disclosure.
Figure 6B:
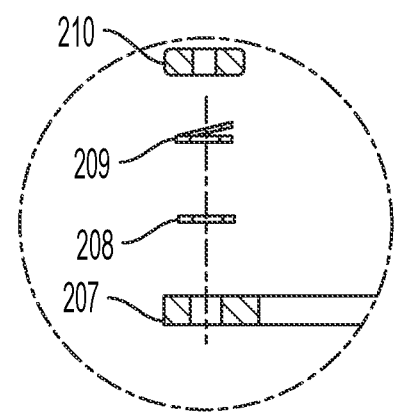
Figure 6C:
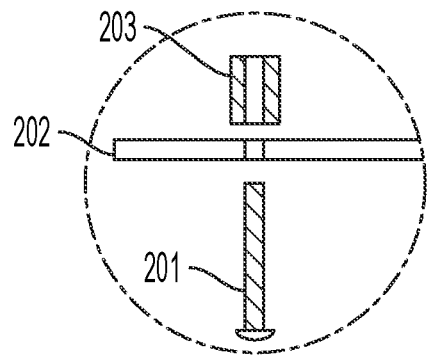
Figure 7A:
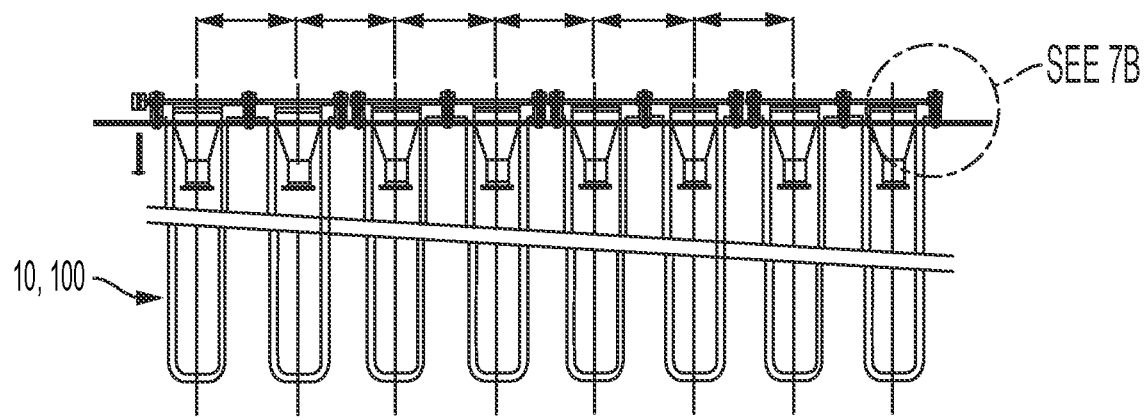
FIGS. 7A and 7B are a sectional and detail view of a modular filter installation according to an embodiment of the present disclosure.
Figure 7B:
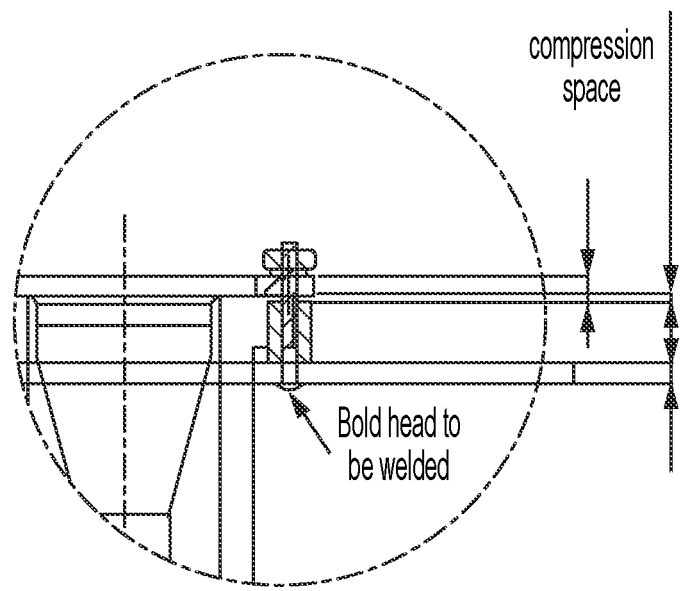

With reference to FIGS. 6A-6C, the modular filters 10, 100 may be installed onto a cell plate 202 of the bag house 200. According to the embodiment shown in FIGS. 6A-6C, spacer 203 is placed between the cell plate 202 and a gasket 204. A lip portion of the modular filters 10, 100 may rest on top of the gasket 204 and a clamping plate 207 may be placed on top of the modular filters 10, 100. In one or more embodiments, a Venturi 206 may be inserted into the modular filters 10, 100 prior to applying the clamping plate 207. A bolt 201 may be inserted from below the cell plate 202 and through the cell plate 202, spacer 203 and clamping plate 207. The bolt 201 may be secured by nut 210 and one or more washers (e.g., washer 208 and/or spring washer 209) may be placed between the nut 210 and clamping plate 207. In one or more embodiments, as shown in FIGS. 7A and 7B, the bolt 201 may be further welded to the cell plate 202. In one or more embodiments, each of the cell plate 202 and the clamping plate 207 may be about 10 mm (i.e., 8 to 12 mm), 5-20 mm, or 5-15 mm thick. In one or more embodiments, the cell plate 202 and the clamping plate 207 may be spaced by about 36 mm (i.e., 34-38 mm), 25-45 mm, or 30-40 mm.

Figure 8A:
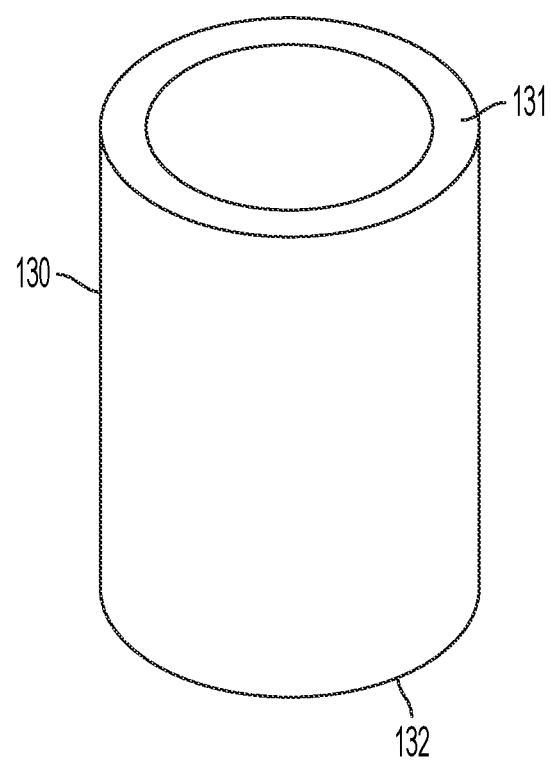
FIG. 8A is a perspective view of a connector sleeve according to an embodiment of the present disclosure.

Turning to FIG. 8A, according to embodiments of the present disclosure, the upper and lower filter portions 11, 12 may be joined using a sleeve 130. The sleeve 130 greatly increases a bonding area between the respective filter portions 11, 12. This is important because each filter portion may weigh about 8 kg and may accumulate another 16 kg of filter cake thereon, such that the joint must be able to hold 24 kg (i.e., the lower filter portion 11 suspended from the upper filter portion 12). Further, the Venturi 206 may generate pressures of up to about 6 bars when used to remove filter cake from the modular filter 10. As such, the joint 15 must be strong and resilient.

Figure 8B:
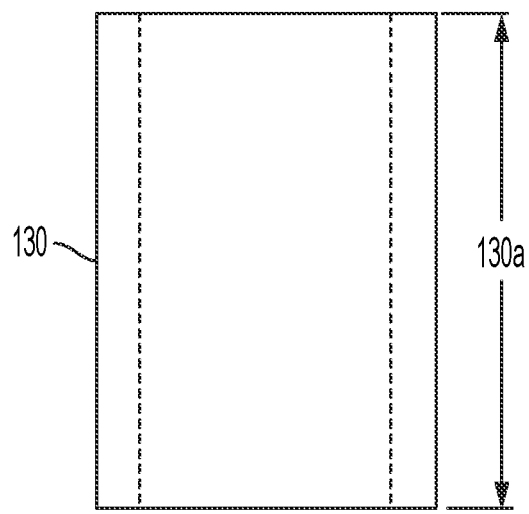
FIG. 8B is a sectional view of the connector sleeve shown in FIG. 8A.
Figure 8C:
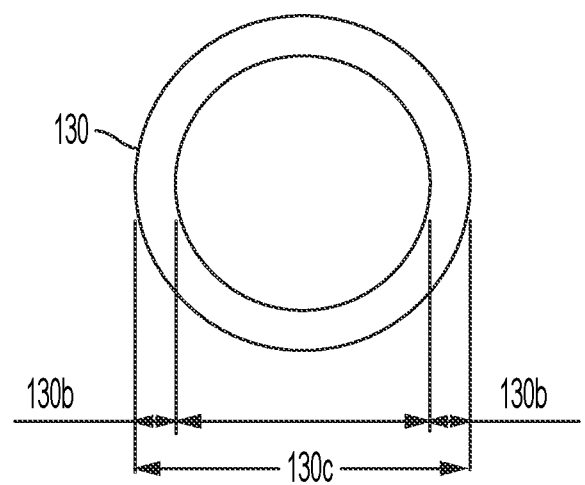
FIG. 8C is a top view of the connector sleeve shown in FIG. 8A.

The sleeve 130 may have a cylindrical shape with an open top end 131 and an open bottom end 132. With reference to FIGS. 8B and 8C, in one or more embodiments, the sleeve 130 may have a length 130a of about 140 mm (i.e., 135-145 mm), 40-240 mm, 60-220 mm, 80-200 mm, 100-180 mm, or 120-160 mm. The length 130a of the sleeve 130 may be appropriately adjusted based on the length of the respective filter portions 11, 12 being joined. For instance, assuming equal sized filter portions 11, 12, one half of the sleeve 130 may be inserted into each of the filter portions, and the insertable length (here, one half of the length 130a of the sleeve 130) may be 0.5-10%, 1-8%, 3-8%, 4-6%, 2-5%, 1-2%, or 2-3% of the length of the filter portion. In one or more embodiments, the length of sleeve 130 inserted into the respective filter portions 11, 12 may be unequal, for example, if the lengths of the filter portions 11, 12 are unequal. In one or more embodiments, the sleeve may have a wall thickness 130b of about 12 mm (i.e., 10-14 mm), 4-18 mm, 6-18 mm, or 8-16 mm. The wall thickness 130b may be increased or decreased based on the outer diameter 130c of the sleeve 130 (i.e., for use with smaller or larger modular filters). For instance, a ratio of the outer diameter 130c of the sleeve 130 to the wall thickness 130b of the sleeve 130 may be set to 5-10, 6-9, 7-8, or 7.5. The outer diameter 130c of the sleeve 130 must be set such that the sleeve 130 may be insert, at least partially, into each of the filter portions 11, 12 to be joined. In one or more embodiments, the outer diameter 130c of the sleeve 130 may be about 95 mm (i.e., 93-97 mm), 70-120 mm, 80-110 mm, or 90-100 mm. In one or more embodiments, the outer diameter 130c is 0.5-8 mm, 1-7 mm, 2-6 mm, 2-4 mm, or 3-5 mm less than the inner diameter 212a of the filter portion 11, 12 in order to accommodate an adhesive between the sleeve 130 and the filter portions 11, 12. In one or more embodiments, the sleeve 130 does not have a constant diameter and instead tapers from one end 131 to the other end 132.

In one or more embodiments, the sleeve 130 comprises low expansion cordierite-containing refractory pre-fired to 1100° C. In some embodiments, the sleeve 130 comprises mullite, silicon carbide, zirconia, alumina, and/or alumina-titania. Due to the low expansion, the sleeve 130 is very thermal shock resistant resulting in minimal thermal stresses at the joint 15. Modular filter 10, 100 may operate between 500° C. and 1000° C. with regular air blows (via Venturi 206) to remove filter cake build up. As such, a thermal shock resistant coupling is important for a long runtime. In one or more embodiments, the sleeve has a reversible thermal expansion at 1000° C. of 0.2%, at most 0.8%, at most 0.6%, at most 0.5%, at most 0.4%, or at most 0.3%. The sleeve 130 may have a hot modulus of rupture at 800° C. of at least 16 MPa, at least 12 MPa, or at least 14 MPa. The sleeve 130 may have a cold crushing strength after firing at 800° C. of at least 70 MPa, at least 60 MPa, or at least 50 MPa. The sleeve 130 may have a thermal conductivity at 800° C. of 1-1.5 Watts per meter-Kelvin (W/mK), 1.1-1.4 W/mK, 1.2-1.3 W/mK, 1.22 W/mK, or 2 W/mK. A density of the sleeve 130 may be 1900-3000 kg/m³, 1900-2200 kg/m³, 1950-2150 kg/m³, 2000-2100 kg/m³, 2080 kg/m³, or 3000 kg/m³. The sleeve 130 may have a porosity (per ASTM C20) of 10-40%, 15-30%, or 20%.

The sleeve 130 may be bonded to the filter portions 11, 12 using an adhesive. According to some embodiments, the adhesive is a fast setting adhesive that sets in, for example, less than 15 minutes, less than 12 minutes, less than 10 minutes, 5-10 minutes, less than 8 minutes, or less than 5 minutes. Fast setting allows a high installation rate in situations where several hundred filters need to be installed in a bag house. Due to height restrictions of a bag house, the filter portions 11, 12 may be separately lowered into a tube sheet and then bonded. In some embodiments, this process may take about 5-7 minutes, and the adhesive should set and develop sufficient strength within this time range. Additionally, the adhesive must be strong enough to sustain mechanical vibration and backpressure of up to 6 bars from filter cleaning by compressed air. It is also expected that filter cake build-up increases the weight of the lower filter portion 11 from around 8 kg up to 24 kg in operation. Lastly, the modular filter 10 may be used as a hot gas filter, which typically operates at around 500-1000° C. The adhesive must keep its integrity and full strength over this temperature range.

According to one or more embodiments, the adhesive comprises a liquid binder, a reactive filler, a non-reactive filler, and a setting component. The liquid binder may comprise a phosphate-containing acidic component, such as aluminum-phosphate monobasic (hereinafter MAP) and/or phosphoric acid. The liquid binder may further comprise a solvent, such as water. When the liquid binder comprises MAP, the concentration of MAP in the liquid binder may be, for example, 30-70 wt %, 40-60 wt %, or 45-55 wt %. When the binder comprises phosphoric acid, the concentration of phosphoric acid in the liquid binder may be, for example, 20-75 wt %, 30-70 wt %, 40-60 wt %, or 50 wt %. The reactive filler may be any component that reacts with the liquid binder at elevated temperatures (above 250° C.). For example, if the liquid binder comprises MAP, the reactive filler may include alumina (e.g., calcined alumina and/or tabular alumina) and/or mullite. The reactive filler provides added strength to the bond at joint 15 after the modular filter 10 is in use (which, as noted above, may be in temperature ranges of about 500-1000° C.). The non-reactive filler is non-reactive with the liquid binder at temperatures up to 1000° C. In one or more embodiments, the non-reactive filler comprises a high surface area micro-particle. For instance, if the liquid binder comprises MAP, the non-reactive filler may comprise micro-silica. The setting component is reactive with the liquid binder at ambient temperature (e.g., 0-50° C. or 20-30° C.). For example, when the liquid binder comprises MAP, the setting component may comprise an alkaline earth metal oxide, such as magnesium oxide (e.g., calcined magnesium oxide).

According to an embodiment, the adhesive may comprise a liquid binder that is 48% MAP, calcined alumina and tabular alumina as the reactive filler, micro-silica as the non-reactive filler, and calcined magnesium oxide as the setting component. The setting reaction at ambient temperature can be described as follows:

$$2MgO + Al(H_2PO_4)_3 \rightarrow 2MgHPO_4 \cdot 3H_2O + AlPO_4 \cdot nH_2O \quad (1)$$

The adhesive strength further increases at temperatures above 250° C., wherein a polycondensation reaction of excess MAP with alumina occurs as follows:

$$Al(H_2PO_4)_3 + Al_2O_3 \rightarrow 3AlPO_4 \cdot nH_2O \quad (2)$$

In one or more embodiments, the liquid binder comprises phosphoric acid and the setting component comprises magnesium oxide. The setting reaction at ambient temperature can be described as follows:

$$MgO + 2H_3PO_4 \rightarrow Mg(H_2PO_4)_2 + H_2O \quad (3)$$

According to one or more embodiments of the present disclosure, the adhesive may be prepared by mixing the dry components (i.e., the reactive filler, non-reactive filler, and setting component, hereinafter "dry mixture") in predetermined ratios and then adding the liquid binder to the dry mixture. This may be referred to as a dry mixture method of preparing the adhesive. The amount of reactive filler may be, for example, 60-95 wt %, 70-90 wt %, or 80-85 wt %, based on the total weight of the dry mixture. The amount of non-reactive filler may be, for example, 1-30 wt %, 5-20 wt %, or 5-15 wt %, based on the total weight of the dry mixture. The amount of setting component may be, for example, 1-20 wt %, 4-12 wt %, or 6-10 wt %, based on the total weight of the dry mixture. According to an embodiment, the dry mixture comprises 82 wt % of alumina, 10 wt % of silica, and 8 wt % of magnesium oxide.

The amount of liquid binder added to the dry mixture is not entirely limited and the weight ratio of liquid binder to dry mixture may be, for example, 0.1-2, 0.25-1.5, 0.5-1, or 0.40 to 0.6. In one or more embodiments, the liquid binder is added until a desired texture is obtained, allowing for easy application of the adhesive. Upon addition of the liquid binder, an immediate exothermic reaction occurs, and setting occurs within a short time (e.g., less than 15 minutes, less than 12 minutes, less than 10 minutes, 5-10 minutes, less than 8 minutes, or less than 5 minutes). This method works best with small batches, that is, an amount of adhesive that may be used within the setting time. This may be, for example, an amount of adhesive for a single joint 15.

In other embodiments, the components of the adhesive that are non-reactive at ambient temperature (i.e., the liquid binder, the reactive filler, and the non-reactive filler, hereinafter "wet mixture") are mixed together and then the setting component is separately introduce into the wet mixture. This may be referred to as a wet mixture method of preparing the adhesive. The wet mixture will not set at ambient temperature, which allows for larger batches to be used as compared with the dry mixture method described above. In one or more embodiments, the amount of reactive filler, based on a total weight of the wet mixture, is 50-80 wt %, 60-75 wt % or 65-70 wt %. In one or more embodiments, the amount of non-reactive filler, based on a total weight of the wet mixture, is 1-15 wt %, 2-12 wt %, or 5-10 wt %. In one or more embodiments, the amount of liquid binder, based on a total weight of the wet mixture, is 10-50 wt %, 20-40 wt % or 25-35 wt %.

Figure 9:
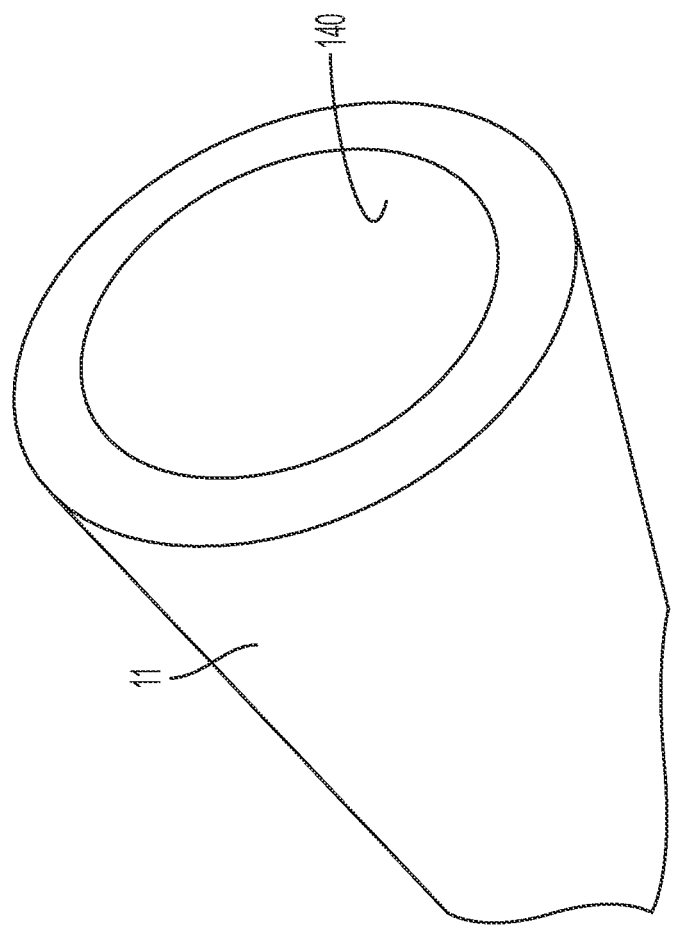
FIG. 9 is a perspective view of a modular candle filter section according to an embodiment of the present disclosure.

FIGS. 9-14 demonstrate an example of the wet mixture method. With reference to FIG. 9, in order to bond the sleeve 130 to the lower filter portion 11, a reactive layer 140 is applied to an inner surface of lower filter portion 11. The reactive layer 140 comprises the setting component. The reactive layer 140 may further comprise a solvent or binder to aid in application of the reactive layer 140 to the filter portions 11, 12. The binder may comprise a dissolvable hydrocarbon, such as a saccharide. In one or more embodiments, the reactive layer 140 may be applied as a mixture of water and magnesium oxide, and optionally dried into a powder. The amount of the setting component within the reactive layer 140 should be sufficient to ensure proper setting of the adhesive.

Figure 10:
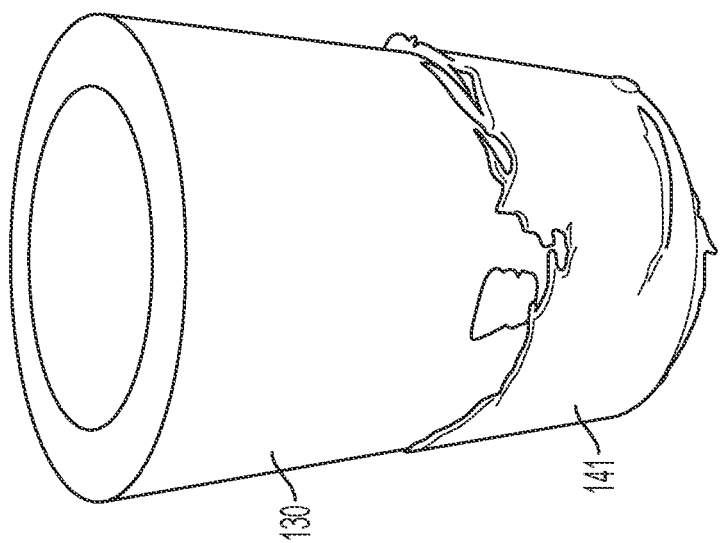
FIG. 10 is a perspective view of the connector sleeve of FIGS. 8A-8C with an adhesive applied to a lower exterior thereof.
Figure 11B:
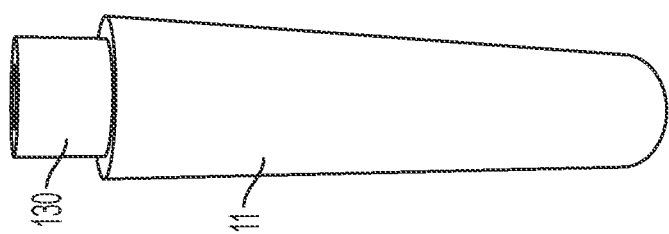
FIGS. 11a and 11B are perspective views of the connector sleeve of FIG. 10 inserted into the modular candle filter section of FIG. 9.
Figure 11A:
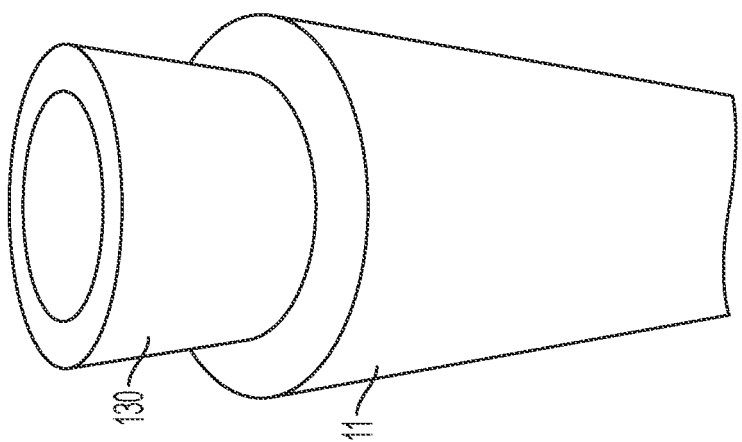

As shown in FIG. 10, the wet mixture 141 is applied to an outer surface of the sleeve 130. In the embodiment shown, the wet mixture 141 is only applied to the portion of the sleeve 130 that is to be inserted into the lower filter portion 11. Next, as shown in FIGS. 11A and 11B, the portion of the sleeve 130 having the wet mixture 141 applied thereon is inserted into the lower filter portion 11, wherein a portion of the sleeve 130 is exposed and extends from the lower filter portion 11. In one or more embodiments, prior to applying the upper filter portion 12, the adhesive between the sleeve 130 and the lower filter portion 11 may be allowed to set.

Figure 14:
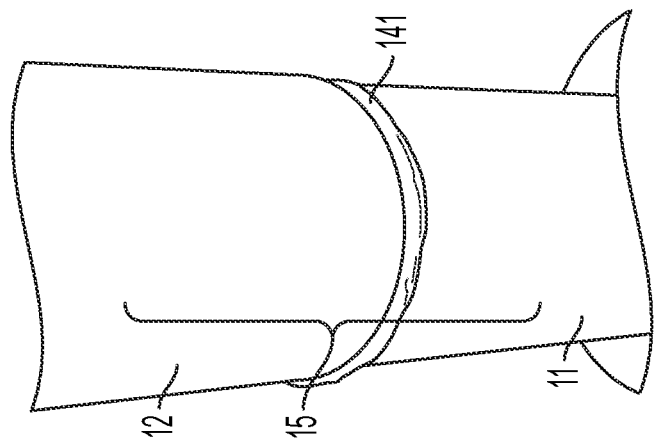
FIG. 14 is a perspective view of the junction of the modular candle filter sections according to an embodiment of the present disclosure.
Figure 13:
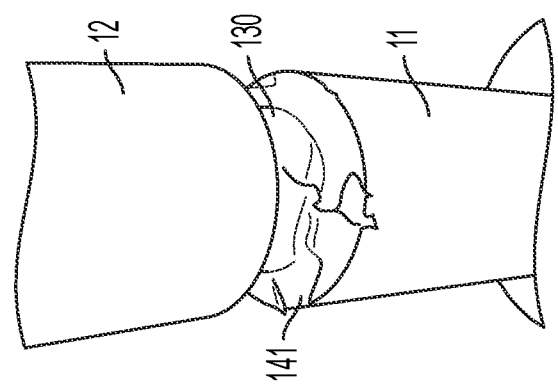
FIG. 13 is a perspective view of a second modular candle filter section being attached to assembly shown in FIG. 12.
Figure 12:
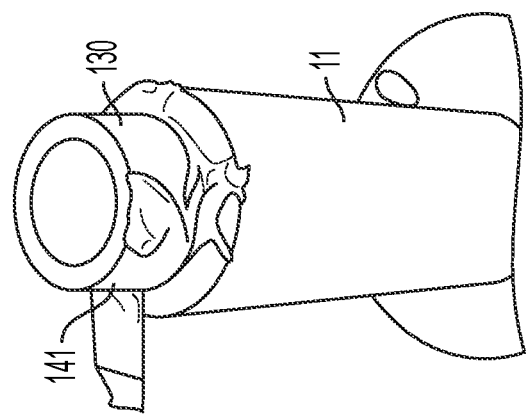
FIG. 12 is a perspective view of an upper exterior of the connector sleeve of FIGS. 11A and 11B with an adhesive applied thereto.

Turning to FIG. 12, the wet mixture 141 is applied to the exposed portion of the sleeve 130. As shown in FIG. 13, the upper filter portion 12, having a reactive layer 140 applied to an interior surface thereof, is positioned over the exposed portion of the sleeve 130. The final joint 15 is shown in FIG. 14.

According to one or more embodiments, the modular filter 10 may be transported as a kit, the kit comprising a first filter portion, a second filter portion, and the wet mixture 141. The first filter portion includes the sleeve 130 installed therein using the adhesive disclosed herein, wherein a portion of the sleeve 130 is exposed and extends from the first filter portion. The first filter portion may be the lower filter portion 11 or the upper filter portion 12. The second filter portion includes the reactive layer 140 applied to an inner surface of one end thereof. The second filter portion is the other of the lower filter portion 11 and the upper filter portion 12. After receipt of the kit, the user may apply the wet mixture 141 to the exposed portion of the sleeve 130 and then fit the exposed portion of the sleeve 130 into the end of the second filter having the reactive layer 140 applied therein.

Figure 15:
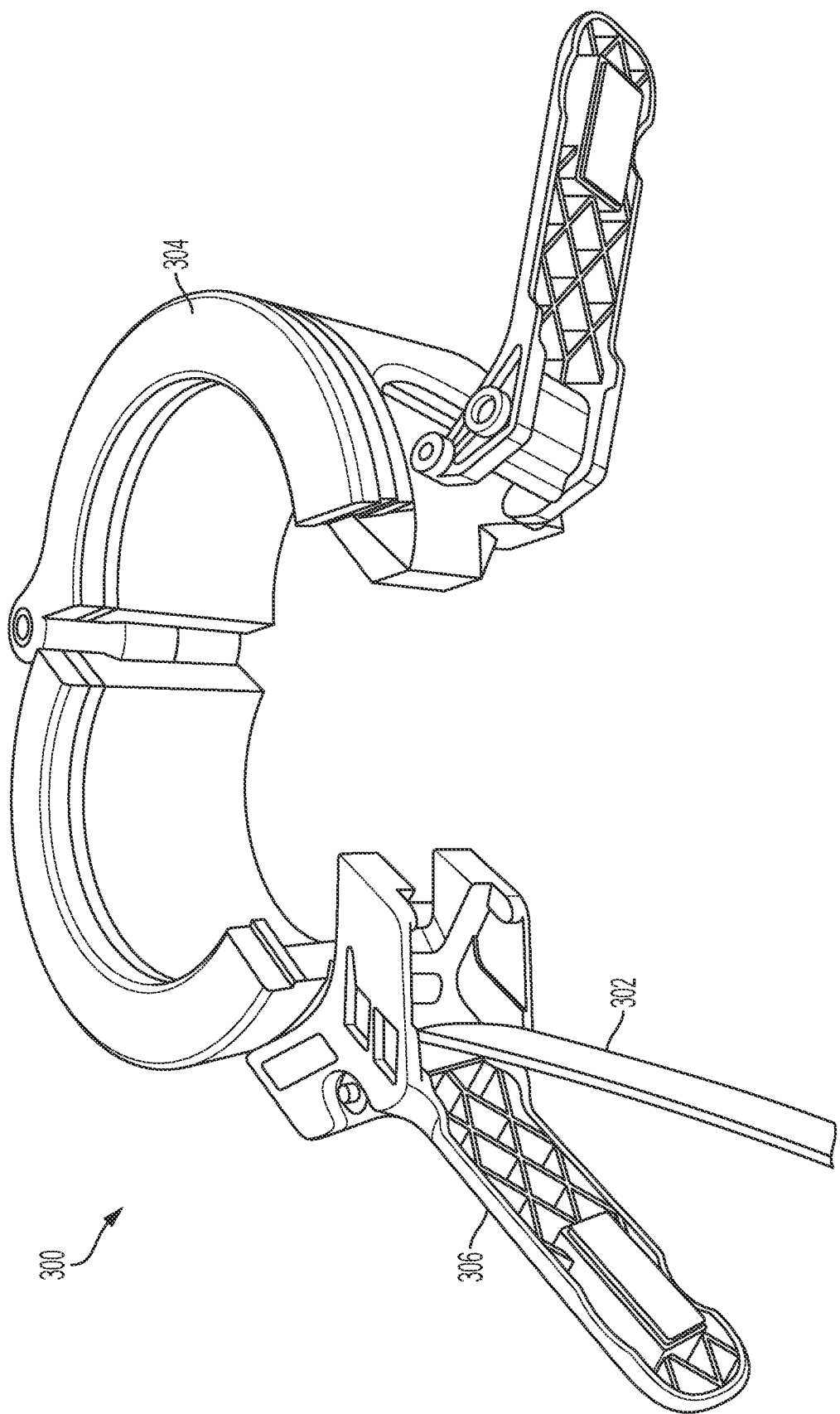
FIG. 15 is a perspective view of a clamp usable in an embodiment of the present disclosure.

Turning to FIG. 15, a clamp 300 may be used to aid in the installation of the modular filter 10, 100. The clamp 300 comprises a tightening mechanism 302, such as a ratcheting belt. The clamp further comprises a protective sleeve 304 shaped to accommodate the lower filter portion 11 therein. In some embodiments, the protective sleeve 304 may be hinged. The material forming the protective sleeve 304 is not particularly limited and may include, for example, rubber and/or plastic. In some embodiments, the protective sleeve 304 is formed from a 3D printed plastic. In some embodiments, an inner surface of the protective sleeve 304 includes a taper, ridges, or other structures to help grip an outer surface of the lower filter portion 11.

Figure 16:
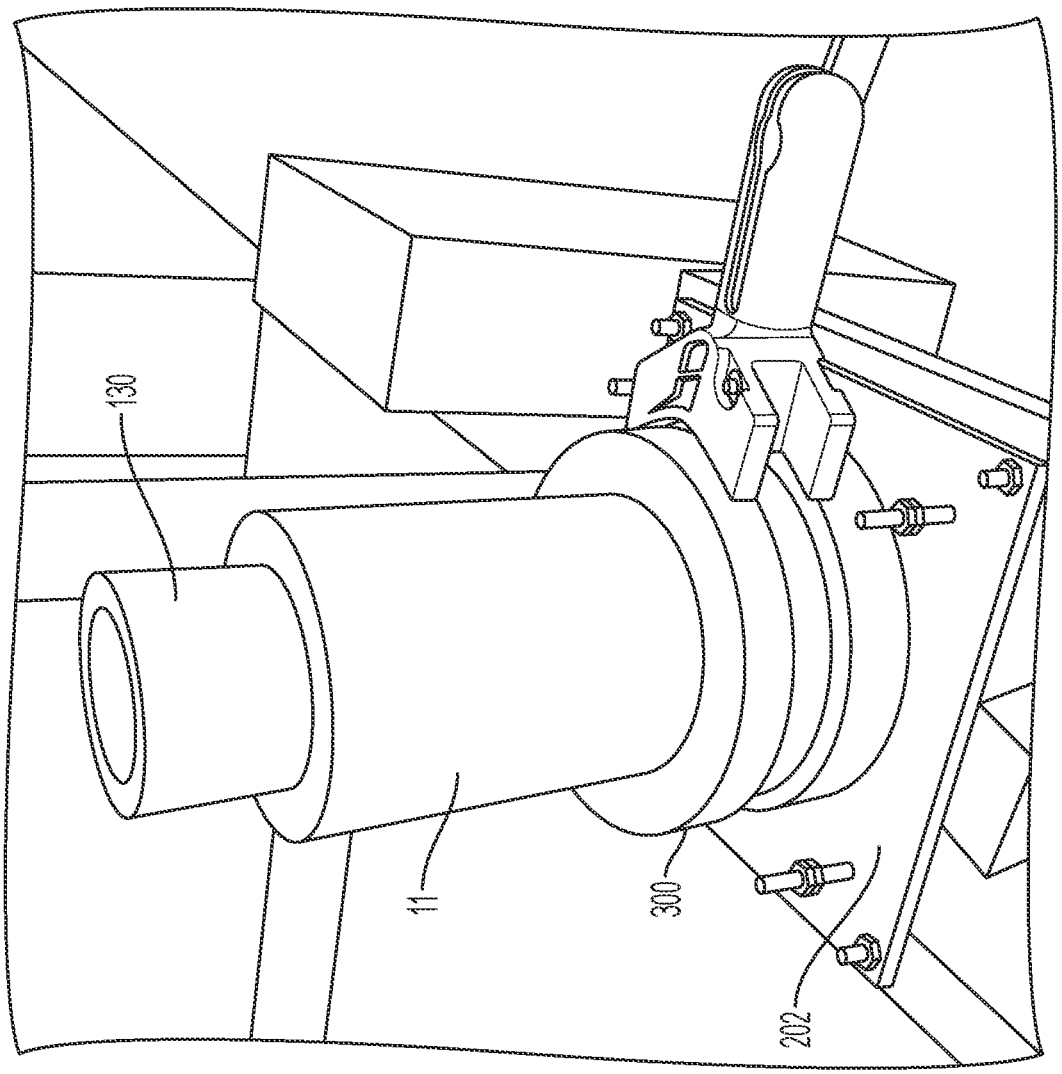
FIG. 16 is a partial perspective view of a clamp being used in an installation method according to an embodiment of the present disclosure.

FIG. 16 depicts the clamp 300 being used to help install the modular filter 10, 100 in a bag house 200. In practice, the lower filter portion 11 may be partially lowered through an opening in the cell plate 202 leaving a portion thereof extending above the cell plate 202. The clamp 300 may then be secured to the lower filter portion 11 and the lower filter portion 11 may then be further lowered until the clamp 300 rest on the cell plate 202. The clamp 300 acts as a temporary flange to suspend the lower filter portion 11 from the cell plate 202. As such, the clamp 300 has a diameter that is greater than a diameter of the opening in the cell plate 202. In some embodiments, the clamp 300 may be secured to the lower filter portion 11 prior to insertion into the opening in the cell plate 202. Once the clamp 300 is securely suspending the lower filter portion in the bag house 200, the upper filter portion 12 may be attached according to any of the methods described above. After the modular filter 10, 100 has been assembled and the adhesive has set, the clamp 300 may be removed. The modular filter 10, 100 may then be fully lowered into the bag house 200 such that the flange 12b, 125 rests on the cell plate 202, and the modular filter 10, 100 may be secured in place as described above.

In embodiments wherein the modular filter 10, 100 includes three or more filter portions, a first pair of filter portions may be joined using the clamp 300 as described above. Thereafter, the clamp 300 may be used to suspend the joined pair of filter portions from the cell plate 202 such that a third filter portion may be joined with the pair. This process may be repeated as needed.

It is understood that variations may be made in the foregoing without departing from the scope of the disclosure. In one or more embodiments, the elements and teachings of the various disclosed embodiments may be combined in whole or in part in some or all of the disclosed embodiments. In addition, one or more of the elements and teachings of the various disclosed embodiments may be omitted, at least in part, or combined, at least in part, with one or more of the other elements and teachings of the various disclosed embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In one or more embodiments, while different steps, processes, and procedures are described as appearing as distinct acts, one or more of the steps, one or more of the processes, or one or more of the procedures may also be performed in different orders, simultaneously or sequentially. In one or more embodiments, the steps, processes or procedures may be merged into one or more steps, processes or procedures. In one or more embodiments, one or more of the operational steps in each embodiment may be omitted. Moreover, in some instances, some features of the present disclosure may be employed without a corresponding use of the other features.

Although several embodiments have been disclosed in detail above, the embodiments disclosed are not limiting, and those skilled in the art will readily appreciate that many other modifications, changes, and substitutions are possible in the disclosed embodiments without materially departing from the novel teachings and advantages of the present disclosure. Accordingly, all such modifications, changes, and substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A system for forming a modular candle filter, the system comprising:
    a hollow first filter portion having an open end;
    a hollow second filter portion having an open end;
    a sleeve configured to fit within the open end of the first filter portion and the open end of the second filter portion; and
    an adhesive configured to bind the sleeve to each of the first filter portion and the second filter portion;
    wherein the adhesive comprises:
        a liquid binder;
        a reactive filler, the reactive filler being reactive with the liquid binder only at temperatures above 250° C.;
        a non-reactive filler, the non-reactive filler not being reactive with the liquid binder; and
        a setting component, the setting component being reactive with the liquid binder at ambient temperature.

2. The system of claim 1, wherein the liquid binder comprises a phosphate-containing acidic component, the reactive filler comprises alumina, the non-reactive filler comprises silica, and the setting component comprises an alkaline earth metal oxide.

3. The system of claim 1, wherein a length of the sleeve is between 1% and 5% of a combined length of the first filter portion and the second filter portion.

4. The system of claim 1, wherein an inner diameter of the open end of the first filter portion is equal to an inner diameter of the open end of the second filter portion; and
    wherein an outer diameter of the sleeve is 1-8 mm less than the inner diameter of the open end of the first filter portion.

5. The system of claim 1, further comprising a flange adhered to the first filter portion or the second filter portion, wherein the flange comprises mullite, silicon carbide, zirconia, alumina, and/or alumina-titania.

6. A method of forming a modular candle filter, comprising:
    supplying a hollow first filter portion having an open end;
    supplying a hollow second filter portion having an open end;
    supplying a sleeve configured to fit within the open end of the first filter portion and the open end of the second filter portion;
    applying an adhesive to at least one of the sleeve and the first filter portion and inserting the sleeve into the open end of the first filter portion; and
    applying the adhesive to at least one of the sleeve and the second filter portion and inserting the sleeve into the open end of the second filter portion;
    wherein the adhesive comprises:
        a liquid binder;
        a reactive filler, the reactive filler being reactive with the liquid binder only at temperatures above 250° C.;
        a non-reactive filler, the non-reactive filler not being reactive with the liquid binder; and
        a setting component, the setting component being reactive with the liquid binder at ambient temperature.

7. The method of claim 6, wherein applying the adhesive to at least one of the sleeve and the first filter portion comprises applying a wet mixture comprising the liquid binder, the reactive filler, and the non-reactive filler to one of the sleeve and the first filter portion, applying the setting component to the other of the sleeve and the first filter portion, and inserting the sleeve into the open end of the first filter portion; and
    wherein applying the adhesive to at least one of the sleeve and the second filter portion comprises applying the wet mixture to one of the sleeve and the second filter portion, applying the setting component to the other of the sleeve and the second filter portion, and inserting the sleeve into the open end of the second filter portion;
    wherein, the wet mixture and the setting component are configured to react and adhere the sleeve to the each of the first filter portion and the second filter portion.

8. The method according to claim 7, wherein the liquid binder comprises a phosphate-containing acidic component, the reactive filler comprises alumina, the non-reactive filler comprises silica, and the setting component comprises an alkaline earth metal oxide.

9. The method according to claim 7, wherein the setting component is applied to an interior surface proximate the open end of the first filter portion and an interior surface proximate the open end of the second filter portion.

10. The method according to claim 9, wherein the wet mixture is applied to an entire outer surface of the sleeve.

11. The method according to claim 7, wherein a length of the sleeve is between 1% and 5% of a combined length of the first filter portion and the second filter portion.

12. The method of claim 6, further comprising:
adhering a flange to the hollow first filter portion or the hollow second filter portion at the open end thereof.

13. The method of claim 12, wherein the flange comprises mullite, silicon carbide, zirconia, alumina, and/or alumina-titania.

14. The method of claim 12, wherein the adhering utilizes the adhesive.

15. A kit, comprising:
a hollow first filter portion having an open end;
a hollow second filter portion having an open end, wherein the second filter portion has a setting component applied to an interior surface proximate the open end;
a sleeve positioned within the open end of the first filter portion and adhered to the first filter portion, wherein at least a portion of the sleeve extends from the first filter portion and is configured to fit within the open end of the second filter portion; and
a wet mixture configured to react with the setting component and adhere the sleeve to the second filter portion.

16. The kit according to claim 15, wherein the wet mixture comprises:
a liquid binder;
a reactive filler, the reactive filler being reactive with the liquid binder only at temperatures above 250° C.; and
a non-reactive filler, the non-reactive filler not being reactive with the liquid binder; and
wherein the setting component is reactive with the liquid binder at ambient temperature.

17. The kit according to claim 16, wherein the liquid binder comprises a phosphate-containing acidic component, the reactive filler comprises alumina, the non-reactive filler comprises silica, and the setting component comprises an alkaline earth metal oxide.

18. The kit according to claim 15, wherein a length of the sleeve is between 1% and 5% of a combined length of the first filter portion and the second filter portion.

19. The kit according to claim 15, further comprising a clamp configured to be removably attached to an outer surface of the hollow first filter portion or the hollow second filter portion.

20. The kit according to claim 15, further comprising a flange adhered to the hollow first filter portion or the hollow second filter portion at the open end thereof, wherein the flange comprises mullite, silicon carbide, zirconia, alumina, and/or alumina-titania.

21. A method of installing a modular candle filter in a bag house, comprising:
inserting a lower portion of a hollow first filter portion into an opening of a cell plate of the bag house, wherein the first filter portion has an open end opposite the lower portion and wherein a sleeve is adhered to an inner surface of the first filter portion proximate the open end such that the sleeve protrudes from the open end;
securing a clamp to an outer surface of the first filter portion proximate the open end above the cell plate, wherein the clamp has a diameter that is greater than a diameter of the opening of the cell plate;
suspending the first filter portion on the cell plate using the clamp;
supplying a hollow second filter portion having an open end, wherein the sleeve is configured to fit within the open end of the second filter portion; and
applying an adhesive to at least one of the sleeve and the second filter portion and inserting the sleeve into the open end of the second filter portion thereby forming the modular candle filter.

22. The method of claim 21, wherein the second filter portion comprises a flange adhered at a second open end thereof opposite the open end, wherein the flange comprises mullite, silicon carbide, zirconia, alumina, and/or alumina-titania.

23. The method of claim 22, further comprising:
removing the clamp;
lowering the modular candle filter through the opening in the cell plate and suspending the modular candle filter using the flange; and
securing the flange to the cell plate.

24. The method of claim 21, wherein the adhesive comprises:
a liquid binder;
a reactive filler, the reactive filler being reactive with the liquid binder only at temperatures above 250° C.;
a non-reactive filler, the non-reactive filler not being reactive with the liquid binder; and
a setting component, the setting component being reactive with the liquid binder at ambient temperature.

25. The method of claim 21, wherein the second filter portion comprises an integrally formed flange at a second open end thereof opposite the open end.

26. The method of claim 21, wherein the clamp comprises a protective sleeve shaped to accommodate the first filter portion therein; and
and wherein the protective sleeve comprises plastic or rubber.

27. The method of claim 26, wherein an inner surface of the protective sleeve comprises a ridge or a taper.

* * * * *